(12) United States Patent
Goetzfried et al.

(10) Patent No.: US 7,252,155 B2
(45) Date of Patent: Aug. 7, 2007

(54) PERCUSSIVE POWER TOOL WITH FLUSHING HEAD

(75) Inventors: Stefan Goetzfried, Kleinkitzighofen (DE); Udo Hauptmann, Landsberg/Lech (DE); Konrad Artmann, Schondorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/149,369

(22) Filed: Jun. 9, 2005

(65) Prior Publication Data
US 2005/0274534 A1 Dec. 15, 2005

(30) Foreign Application Priority Data
Jun. 11, 2004 (DE) .................. 10 2004 028 371

(51) Int. Cl.
*E21B 3/00* (2006.01)

(52) U.S. Cl. .................. 173/117; 173/128; 173/132; 173/138; 408/57; 408/59

(58) Field of Classification Search .................. 173/48, 173/93, 93.6, 128, 132, 138, 78, 80, 162.1, 173/206, 117; 408/57, 59
See application file for complete search history.

(56) References Cited

U.S. PATENT DOCUMENTS

| | | | | |
|---|---|---|---|---|
| 2,056,293 A * | 10/1936 | Ludvik | .................. | 173/75 |
| 3,517,755 A * | 6/1970 | Badcock | .................. | 173/117 |
| 3,570,608 A * | 3/1971 | Erma | .................. | 170/201 |
| 3,685,593 A * | 8/1972 | Amtsberg et al. | .................. | 173/14 |
| 3,685,594 A * | 8/1972 | Koehler | .................. | 173/48 |
| 3,866,692 A * | 2/1975 | Stelljes | .................. | 173/48 |
| 3,973,633 A * | 8/1976 | Brannstrom | .................. | 173/75 |
| 4,079,793 A * | 3/1978 | Mosely et al. | .................. | 173/80 |
| 4,151,889 A * | 5/1979 | Lister | .................. | 175/426 |
| 4,241,800 A * | 12/1980 | Stenuick | .................. | 175/400 |
| 4,340,121 A * | 7/1982 | Bailey et al. | .................. | 173/206 |
| 4,993,501 A * | 2/1991 | Zannini | .................. | 173/76 |
| 5,346,023 A * | 9/1994 | Takagi et al. | .................. | 173/178 |
| 5,775,441 A * | 7/1998 | Sakuragi et al. | .................. | 173/200 |
| 6,578,644 B2 * | 6/2003 | Frenzel et al. | .................. | 173/128 |
| 6,758,288 B2 * | 7/2004 | Richter et al. | .................. | 173/217 |
| 6,776,243 B2 * | 8/2004 | Prols et al. | .................. | 173/162.2 |
| 6,923,271 B2 * | 8/2005 | Frauhammer et al. | .................. | 173/132 |

* cited by examiner

*Primary Examiner*—John Sipos
*Assistant Examiner*—Michelle Lopez
(74) *Attorney, Agent, or Firm*—Abelman Frayne & Schwab

(57) ABSTRACT

A power tool (1) having a striking means (5), by which a percussive tool (2) that can be driven at least partially along an axis (A) struck directly and having a flushing bore (4) extending at least partially longitudinally through a tool shank (3), and having a flushing head (6) having a radially inwardly open transverse bore hole (8) connected in a flow-through fashion with a fluid channel (7). The flushing head (6) has at least one hollow cylindrical sleeve-like guide surface (9), which is fitted for an insertion end (10) of the striking tool (2). The striking means (5) sealed by a seal (11a, 11b) is cup-like. The striking means (5) is moveably guided and made fluid tight by the seal (11a, 11b) to embrace the machine-side part of the insertion end (10) having the machine-side open flushing bore (4).

13 Claims, 2 Drawing Sheets

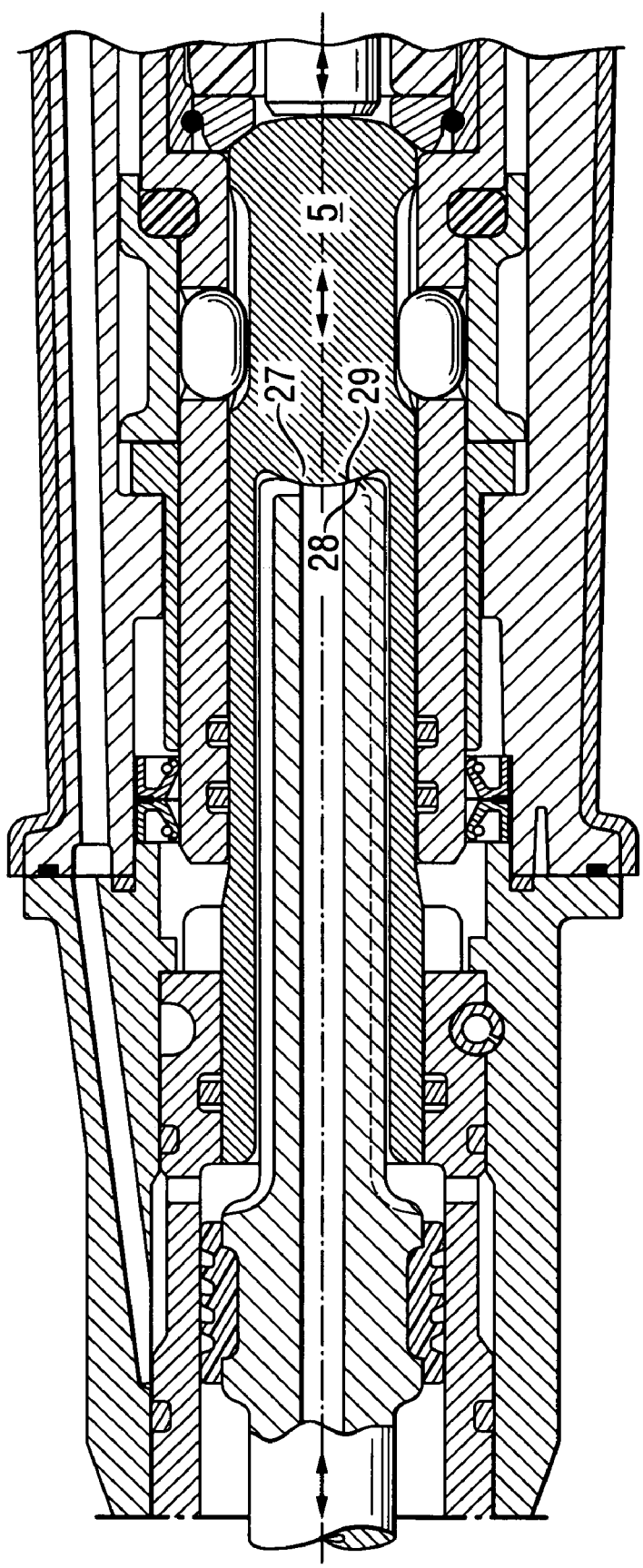

PERCUSSIVE POWER TOOL WITH FLUSHING HEAD

BACKGROUND OF THE INVENTION

Figure 1:
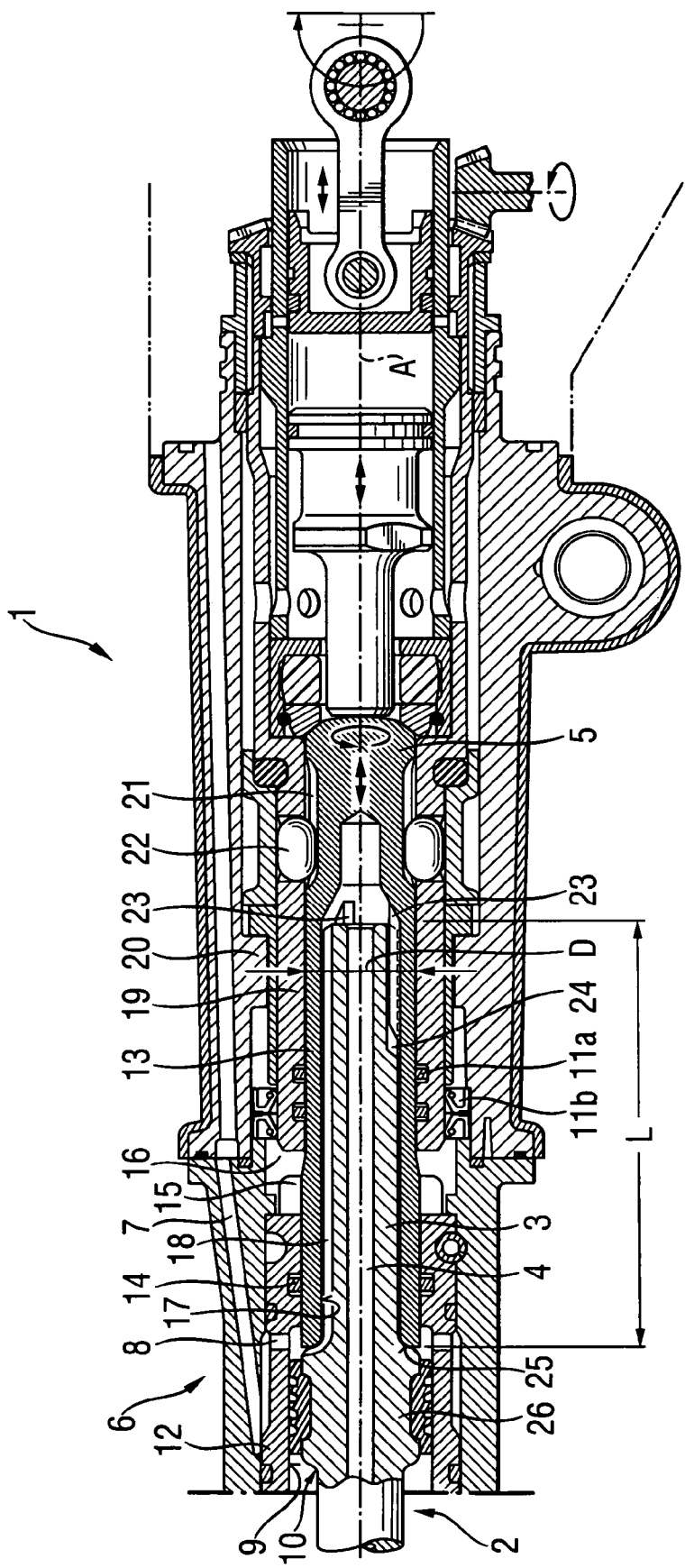

The invention relates to a partially percussive power tool having a flushing head such as a drilling or chisel hammer preferably deployed in mining operations.

High-performance drilling or chisel hammers with a mass of greater than 10 kg, such as those used in mining operations for drilling blast holes, have a flushing bore at least in part running axially along a long tool shaft for passage of liquid flushing and cooling means such as water, which is introduced either centrally via the tool holder or via a flushing head that embraces the tool shank in a zone of a flushing opening.

According to DE 10127984, a rotary and percussive power tool used in mining operations for drilling blastholes has a flushing head that is integral with the housing and radially arranged within a hollow-cylindrical tool holder integrated with the power tool while being impact-freely rotationally driving and guiding for the insertion end of a rock drill. Its long tool shank has an axially running flushing bore hole having front end rotation drive grooves facing in the direction of the insertion end and is closed at the machine end for passage of a liquid flushing and cooling agent such as water, which reaches a transverse bore in the tool shank through the tool holder via a flushing head integrated on the power tool. The machine-side relative to the transverse bore hole required sealing of the insertion end relative to the machine-side open tool holder is dependent on the surface quality of the seal of the insertion end, which is particularly problematic in the rough mining trade and consequently limits the service life of the power tool. In addition, the transverse bore hole represents a predetermined breaking point for the tool shank that is highly stressed with axial striking and this, too, limits the service life of the tool.

In addition, according to DE 3610680, in a percussive power hand tool having a tool holder integrated in the power tool machine for a percussive tool, the tool guide in the integrated tool holder and the rotary and percussive transmission is configured in a pot-shaped anvil head, which is sealed against the pneumatic striking mechanism generating the axial impact.

Furthermore, according to U.S. Pat. No. 4,711,609, the percussive transmission is done by an annular impact face of the percussively driven, hollow cylindrical tool holder on a ring flange on the insertion end of the tool.

SUMMARY OF THE INVENTION

The object of the invention is to provided a robust, machine-side, reliable liquid-tight power tool for a rotary and percussively driven tool with a flushing bore hole.

This object is achieved in accordance with the invention by a power tool having a striking means, via which a striking tool can be driven at least partially along an axis having a flushing bore hole extending at least partially longitudinally through a tool shank, a flushing head having at least one radially internally open transverse bore hole that is connected to a fluid conducting channel and at least one hollow-cylindrical guide surface to allow through flow. The at least one hollow-cylindrical guide surface is configured cup-like for an insertion end of the percussive tool. The striking means is moveably guided by a fluid-tight seal to embrace the machine-side end of the insertion end having the machine-side open flushing bore hole.

The seal of the striking means is adequate for sealing the preferably pneumatic striking mechanism since the flushing head directly guiding the striking tool is combined with a striking means configured cup-like and is guided moveably fluid-tightly, said flushing head fluid-tightly embracing the machine-side end of the insertion end. Any seal leak is insubstantial at the insertion end because the leak fluid can freely flow off on the tool side.

Advantageously, the flushing head has a bearing sleeve arranged coaxially on the radial inside, which forms the hollow-cylindrical guide surface and which is passed through by the transverse bore hole, whereby the latter can be formed from low-wear glide bearing material such as RG7 bronze or carbon fiber reinforced polyamide relative to the rest of the flushing head.

Advantageously, the hollow cylinder of the cup-shaped striking means has an axial length that is greater than three times the external diameter, whereby the striking means forms an acoustically long body of lower acoustic impedance. The axial impacts are acoustically adapted to a long striking tool and consequently can transmit with low reflection, whereby drilling performance is optimized.

Advantageously, the striking means extends on the tool side axially into the flushing head, wherein a flushing seal is further advantageously arranged between the striking mans and the flushing head, whereby on the tool-side relative to the transverse opening an upstream seal is provided that reduces the influx downstream into a leakage space.

Advantageously, the flushing head has a leakage opening to the outside to a leakage space arranged on the machine-side of the flushing seal, whereby the leakage fluid reaching the leakage space and any contamination occurring at the time of changing the tool can flow freely through said leakage opening.

Advantageously, flow grooves are provided on the inside surface of the cup-shaped striking means and extending along the axis, whereby a constantly low flow resistance is produced regardless of the wear of the insertion end for the flushing liquid flowing between the inner surface of the cup-shaped striking means and along the insertion end of the percussive tool.

Advantageously, the striking means is moveably arranged at least partially in a guide sleeve that coaxially surrounds it on the outside, whereby, with respect to the striking mechanism housing, it can be formed from high-strength, low wear material such as steel.

Advantageously, the guide sleeve can be rotated, whereby a rotary percussive movement of the striking means is produced with regard to power tool, an axial oscillation with regard to the guide sleeve and a rotation of same relative to the striking mechanism housing.

Advantageously, the seal of the striking means with respect to the striking mechanism housing is configured by an axial vibration seal such as a strip or bellows seal between the striking means and the guide sleeve and a rotary seal, such as a shaft seal, arranged between the rotary guide sleeve and the striking mechanism housing, whereby a reliable seal is obtained over the entire service life.

Advantageously, the striking means has rotary driving means, which are advantageously rotation drive grooves extending along the axis into which rotation drive bodies affixed in the guide sleeve engage, whereby a torque transmission to the striking means is realized.

Advantageously, the striking means has rotation driver means rotations, which are advantageously drive webs extending along the axis and associated with rotation drive on the insertion end, whereby a torque transmission to the tool is realized.

Advantageously, the striking means on the tool side form a circular ring-shaped striking face, whereby axial strikes on a ring flange arranged at the insertion end of the percussive tool are made possible and the front end of the insertion end is freely passable.

Alternatively, the striking means forms a spherical striking surface on the tool end cup bottom, whereby when striking the frontal surface of the percussive tool, an almost central strike is made with minor guide errors and good impact momentum transfer is made possible.

SUMMARY OF THE INVENTION

The invention will be explained in more detail with reference to the drawings, wherein:

FIG. 1 represents a partial longitudinal section of a power tool in accordance with the invention; and FIG. 2 represents an alternative a power tool in accordance with the invention.

DETAILED DESCRIPTION OF THE INVENTION

According to FIG. 1, a power tool 1 (partially represented) has a striking means 5, which directly strikes a striking tool 2 (partially represented), which is rotationally and percussive driven along an axis A having a flushing bore hole 4 extending longitudinally through a tool shank 3. In addition, the power tool 1 has a flushing head 6 with several transverse bore holes 8 that are radially open, said bore holes are connected with a fluid channel 7 and have a hollow cylindrical guide surface 9, which is fitted for an insertion end 10 of the percussive tool 2. The striking means 5 is guided moveably and made fluid tightly by a seal 11a+11b and is cup-shaped, wherein the machine—side part of the insertion end 10 having the machine—side open flushing bore hole 4 is embraced flow-tight on the machine side. The flushing head 6 made of steel has a bearing sleeve 12 made of bronze and arranged coaxially radially within, which forms the hollow—cylindrical guide surface 9 and through which the transverse bore holes 8 pass. The hollow cylinder 13 of the cup-shaped striking means 5 has an axial length L, which corresponds to the quadruple of the external diameter D. The striking means 5 extends on the tool side axially into the flushing head 12, wherein a flushing seal 14 is arranged between the striking means 5 and the flushing head 6. The flushing head 6 has a leakage opening 15 open to the outside relative to a machine—side leakage space 16 arranged on the machine side of the flushing seal 14. Flow grooves 18 are present at the inside surface 17 of the cup-shaped striking means 5 extending along the axis A. The striking means 5 is axially limited moveable arranged in an external coaxially embracing and rotatable guide sleeve 19 made of steel. With respect to a striking mechanism housing 20 made of aluminum, the seal 11a+11b of the striking means 5 is configured by an axial vibration seal 11a in the from of a strip seal arranged between the striking means 5 and the rotatable guide sleeve 19 and a rotary seal 11b in the form of an shaft seal arranged between the rotatable guide sleeve 19 and the striking mechanism housing 20. In addition, the striking means 5 has a rotary driving means 21 in the form of rotation drive grooves extending along the axis A, into which the rotation drive bodies 22 affixed in the guide sleeve 19 engage. In addition, the striking means 5 has a rotation driver means 23 in the form of rotation drive webs extending along the axis A which engage in the rotation drive grooves 24 at the insertion end 10. On the tool side, the striking means 5 forms a circular annular striking face 25, which strikes axially on an annular flange 26 at the insertion end 10 of the percussive tool 2.

According to a variation represented in cut-out in FIG. 2, the striking means 5 forms a spherical striking surface 28 at the tool—side cup bottom 27, which strikes on the facial surface 29 of the percussive tool 2.

What is claimed is:

1. A power tool, comprising striking means (5) for directly striking a percussive tool (2) at least partially displaceable along an axis (A) and having a flushing bore (4) extending at least partially longitudinally through a shank (3) thereof and open at a power tool side thereof and an insertion end (10), the flushing bore (4) opening at a power tool-side thereof at the insertion end (10); a flushing head (16) having a fluid channel (7) for feeding flushing fluid thereto, at least one, opening radially inwardly, transverse borehole (8) connected in a flow-through fashion with the fluid channel (7), and at least one hollow cylinder-shaped, guide surface (9) for fittingly receiving an insertion end (10) of the percussive tool (2); and at least one seal (11a, 11b) for insuring a flowtight displacement of the striking means (5), the striking means (5) being formed as a cup-shaped member for flowtightly embracing a power tool-side of the insertion end (10) together with a power tool-side opening of the flushing bore (4),
wherein the striking means (5) extends axially into the flushing head (6) on a percussive-tool side thereof,
wherein the power tool further comprises a flushing seal (14) arranged between the flushing head (6) and the striking means (5), and wherein the flushing head (6) has a leakage opening (15) opening outwardly relative to a leakage space (16) provided on a power tool-side side of the flushing seal (14).

2. The power tool of claim 1, wherein the flushing head (6) comprises a coaxial, located radially inwardly, bearing sleeve (12) forming the hollow cylinder-shaped guide surface (9), the transverse borehole (8) extending through a wall of the bearing sleeve (12).

3. The power tool of claim 1, wherein the cup-shaped member has a hollow cylinder part having a diameter (D) and an axial length (L) that exceeds the diameter (D) by more than three times.

4. The power tool of claim 1, wherein a plurality of flow grooves (18) extending the axis (A) is provided on an inner surface (17) of the cup-shaped striking means (5).

5. The power tool of claim 1, further comprising a guide sleeve (19), and wherein the striking means (5) extends at least partially into the guide sleeve (19).

6. The power tool of claim 5, wherein the guide sleeve (19) is rotable.

7. The power tool of claim 6, wherein the at least one seal (11a) is formed as an axially oscillating seal arranged between the guide sleeve (19) and the striking means (5), and wherein the power tool further comprises a rotary seal (11b) arranged between the guide sleeve (19) and a housing (20) of a striking mechanism.

8. The power tool of claim 1, wherein the striking means (5) comprises rotary drive means (21).

9. The power tool of claim 1, wherein the striking means comprises rotary driven means (23).

10. The power tool of claim 1, wherein the striking means (5) forms, on percussive tool-side thereof, a circular striking face (25).

11. The power tool of claim 1, wherein the cup-shaped member has a cup bottom (27) facing the percussive tool (2) and forming a spherical striking surface (28).

12. The power tool (5) of claim 8, wherein the striking means (5) has rotation drive grooves extending parallel to the axis (A), into which rotation drive bodies (22) affixed in the guide sleeve (19) engage.

13. The power tool of claim 9 wherein the striking means (5) has rotation drive webs extending parallel to the axis (A) that can fittingly engage in drive grooves (24) of the insertion end (10).

* * * * *